US011306246B2

(12) United States Patent
Dejneka et al.

(10) Patent No.: US 11,306,246 B2
(45) Date of Patent: Apr. 19, 2022

(54) MULTICHROIC GLASSES

(71) Applicant: CORNING INCORPORATED, Corning, NY (US)

(72) Inventors: Matthew John Dejneka, Corning, NY (US); Timothy James Kiczenski, Corning, NY (US)

(73) Assignee: Corning Incorporated, Corning, NY (US)

( * ) Notice: Subject to any disclaimer, the term of this patent is extended or adjusted under 35 U.S.C. 154(b) by 88 days.

(21) Appl. No.: 16/735,237

(22) Filed: Jan. 6, 2020

(65) Prior Publication Data
US 2020/0181488 A1    Jun. 11, 2020

Related U.S. Application Data

(62) Division of application No. 15/034,765, filed as application No. PCT/US2014/065616 on Nov. 14, 2014, now Pat. No. 10,526,537.

(60) Provisional application No. 61/905,958, filed on Nov. 19, 2013.

(51) Int. Cl.
C09K 11/77 (2006.01)
C03C 3/095 (2006.01)
C03C 4/12 (2006.01)

(52) U.S. Cl.
CPC .......... C09K 11/7706 (2013.01); C03C 3/095 (2013.01); C03C 4/12 (2013.01); C09K 11/7758 (2013.01); C09K 11/7774 (2013.01); C09K 11/7792 (2013.01); C03C 2204/00 (2013.01)

(58) Field of Classification Search
CPC ....... C03C 3/095; C03C 4/12; C03C 2204/00; C03C 4/06; C09K 11/7758; C09K 11/7774; C09K 11/7792
See application file for complete search history.

(56) References Cited

U.S. PATENT DOCUMENTS

| 3,022,181 | A | ‡ | 2/1962 | Connelly | C03C 3/087 501/64 |
| 3,338,696 | A | ‡ | 8/1967 | Dockerty | C03B 17/064 65/145 |
| 3,682,609 | A | ‡ | 8/1972 | Dockerty | C03B 17/064 65/83 |
| 3,941,605 | A | ‡ | 3/1976 | Yamashita | C03C 4/06 501/13 |
| 4,018,965 | A |   | 4/1977 | Kerko et al. | |
| 4,148,661 | A | ‡ | 4/1979 | Kerko | C03C 4/06 501/13 |
| 4,751,148 | A | ‡ | 6/1988 | Popma | C03C 3/068 252/30 |
| 4,794,435 | A | ‡ | 12/1988 | Suzuki | G02C 7/102 351/15 |
| 5,039,631 | A |   | 8/1991 | Krashkevich et al. | |
| 5,674,790 | A | ‡ | 10/1997 | Araujo | C03C 3/083 501/52 |
| 6,498,118 | B1 | ‡ | 12/2002 | Landa | C03C 3/095 501/64 |
| 6,716,780 | B2 | ‡ | 4/2004 | Landa | C03C 3/095 501/64 |
| 6,773,635 | B2 | ‡ | 8/2004 | Borrelli | C03C 14/006 252/50 |
| 7,407,902 | B2 | ‡ | 9/2008 | Hasegawa | C03C 3/068 313/58 |
| 2008/0274028 | A1 | ‡ | 11/2008 | Lin | C09K 11/025 423/26 |
| 2010/0031459 | A1 | ‡ | 2/2010 | Holbus | B60S 3/06 15/97 |
| 2011/0314711 | A1 | ‡ | 12/2011 | Jumblatt | G09F 13/18 40/581 |
| 2012/0064134 | A1 | ‡ | 3/2012 | Bourke, Jr | A61K 8/23 424/40 |
| 2013/0128434 | A1 | ‡ | 5/2013 | Yamamoto | C03C 3/095 361/67 |
| 2013/0147179 | A1 | ‡ | 6/2013 | Baloukas | B42D 25/36 283/74 |

(Continued)

FOREIGN PATENT DOCUMENTS

| CN | 1207086 | ‡ | 2/1999 |
| CN | 1207086 A | | 2/1999 |
| CN | 101024551 | ‡ | 8/2007 |

(Continued)

OTHER PUBLICATIONS

International Search Report and Written Opinion of the International Searching Authority, dated Sep. 14, 2015, 7 Pages, EPO.‡
White et al., "The 'Alexandrite Effect' and Optical Study", 52 American Mineralogist 867-871 (1967).‡
Lee et al. "Ribbon plastic optical fiber linked optical transmitter and reciever modules featuring a high alignment tolerance" Optics Express 19(5) 2011, pp. 4301-4309.‡
English Translation of CN201480071890.3 First Office Action dated Nov. 29, 2017, China Patent Office.‡
Janakirama, "Anomalous Magnetic-Moments of 3D Orbital Transition-Metal Ions in Glass" Journal of Scientific & Industrial Research, 33(3):114-119. 1974.‡

(Continued)

Primary Examiner — Elizabeth A. Bolden
(74) Attorney, Agent, or Firm — Svetlana Z. Short

(57) ABSTRACT

A glass having from greater than or equal to about 0.1 mol. % to less than or equal to about 20 mol. % $Ho_2O_3$, and one or more chromophores selected from V, Cr, Mn, Fe, Co, Ni, Se, Pr, Nd, Er, Yb, and combinations thereof. The amount of $Ho_2O_3$ (mol. %) is greater than or equal to 0.7 ($CeO_2$ (mol. %)+$Pr_2O_3$ (mol. %)+$Er_2O_3$ (mol. %)). The glass can include one or more fluorescent ions selected from Cu, Sn, Ce, Eu, Tb, Tm, and combinations thereof in addition to, or in place of the chromophores. The glass can also include multiple fluorescent ions.

10 Claims, No Drawings

(56) References Cited

U.S. PATENT DOCUMENTS

2016/0039709 A1 2/2016 Yamamoto et al.

FOREIGN PATENT DOCUMENTS

| | | | |
|---|---|---|---|
| CN | 101024551 A | | 8/2007 |
| CN | 102960081 A | | 3/2013 |
| EP | 0987731 | ‡ | 3/2000 |
| EP | 987731 A1 | | 3/2000 |
| EP | 1496025 A1 | | 1/2005 |
| EP | 2576234 A1 | | 4/2013 |
| JP | 49098276 A | | 9/1974 |
| JP | 49099610 A | | 9/1974 |
| JP | 49099610 A | ‡ | 9/1974 |
| JP | 49-116111 A | * | 11/1974 |
| JP | 49116111 | ‡ | 11/1974 |
| JP | 49116111 A | ‡ | 11/1974 |
| JP | 49116111 A | | 11/1974 |
| JP | 51-127110 A | | 11/1976 |
| JP | 53085813 | ‡ | 7/1978 |
| JP | 53085813 A | | 7/1978 |
| JP | 61-132537 A | | 6/1986 |
| JP | 61-242925 A | | 10/1986 |
| JP | 50-121307 A | | 9/1987 |
| JP | 11-199271 A | | 7/1999 |
| JP | 4998276 B2 | | 8/2012 |
| JP | 49098276 B2 | ‡ | 8/2012 |
| KR | 20000042497 A | | 7/2000 |
| SU | 1096242 | ‡ | 6/1984 |
| SU | 1096242 A1 | | 6/1984 |
| SU | 1273339 | ‡ | 11/1986 |
| SU | 1273339 A1 | | 11/1986 |
| WO | 2000016169 A1 | | 3/2000 |
| WO | WO-200016169 | ‡ | 3/2000 |
| WO | 2011/150523 A1 | | 12/2011 |

OTHER PUBLICATIONS

Janakirama, "Anomalous Magnetic Moments of Rare-Earth Ions in Glass" Journal of Scientific & Industrial Research, 33(1):14-19. 1974.‡

Janakirama, "Magnetic Properties of Glasses Containing Transition-Metal Ions and Their Relation To Structure of Glass" Journal of Scientific and Industrial Research, 31(4):178-191. 1972.‡

Bernstein, L. R. vol. 67, pp. 356-359, 1982. "Monazite From North Carolina Having the At Fxandrite Effect".‡

Hwa et al. "Elastic Properties of Lanthanum Aluninos-iicale Glasses", Materials Research Bulletin 39(1) 33-40 Jan. 2004.‡

Clayden et a!., Solid State 27Al NMR and FTIR study of lanthanum alumninosilicaie glasses, Journal of Non-Crystalline Solids vol. 258, pp. 11-19 (1999).‡

Janakirama, 33 J. Sci. Ind. Res. 14, No. 1 (1974).‡

White et al., The Alexandrite Effect and Optical Study, 52 American Minerologist 867-71 (1967).‡

Janakirama, 31 J. Sci. Ind. Res. 178, No. 4 (1972).‡

Janakirama, 33 J. Sci. Ind. Res. 114, No. 3 (1974).‡

Bernstein, L. R. vol. 67, pp. 356-359, 1982. "Monazite From North Carolina Having the Alexandrite Effect".‡

English Translation of JP2016532077 Office Action dated Aug. 14, 2018, Japan Patent Office, 3 Pgs.‡

Bernstein, L. R. "Monazite from North Carolina having the alexandrite effect" vol. 67, pp. 356-359, 1982.

Clayden et al. "Solid state Al NMR and FTIR study of lanthanum aluminosilicate glasses" Journal of NonCrystalline Solids 258 (1999) pp. 11-19.

Hwa et al. "Elastic properties of lanthanum aluminosilicate glasses" Materials Research Bulletin 39 (2004) pp. 33-40.

International Search Report and Written Opinion PCT/US2014/065616 dated Sep. 14, 2015.

Janakirama-Rao Bh.V., J.Sci.Ind.Res., 1972, vol. 31, No. 4, p. 178.

Janakirama-Rao Bh.V., J.Sci.Ind.Res., 1974, vol. 33, No. 1, p. 14.

Janakirama-Rao Bh.V., J.Sci.Ind.Res., 1974, vol. 33, No. 3, p. 114.

White, W. B., Roy, R. R. and Crichton, J. M. (1967) The "alexandrite effect" and optical study. American Mineralogist, 52, 867-871.

CN201480071890.3 First Office Action dated Nov. 29, 2017, China Patent Office.

JP2016532077 Office Action dated Aug. 14, 2018, Japan Patent Office.

English Translation of CN201480071890.3 Office Action dated Apr. 27, 2020; 7 Pages; Chinese Patent Office.

European Patent Appliaction No. 14803029.9; Examination Report dated Mar. 19, 20; European Patent Office; 3 Pgs.

* cited by examiner
‡ imported from a related application

MULTICHROIC GLASSES

CROSS-REFERENCE TO RELATED APPLICATIONS

This application is a divisional application and claims the benefit of priority under 35 U.S.C. § 120 of U.S. application Ser. No. 15/034,765 filed on May 5, 2016, which in turn, claims the benefit of priority under 35 U.S.C. § 365 of International Patent Application Ser. No. PCT/US14/65616 filed on Nov. 14, 2014, which in turn, claims the benefit of priority under 35 U.S.C. § 119 of U.S. Provisional Application No. 61/905,958 filed on Nov. 19, 2013, the contents of each of which is relied upon and incorporated herein by reference in their entireties.

FIELD

The present specification generally relates to glass articles comprising photochromic materials and, more specifically, to glass articles comprising multichroic materials.

BACKGROUND

Glasses that change color when exposed to varying light are known. However, the color shift in these glasses is not customizable and, thus, they are not suitable for many uses. For example, the color of such glasses may not be aesthetically pleasing for a specific use. Further, the color-change of the known glasses is not customizable.

Therefore, glasses that change color when exposed to varying temperatures and/or light have a number of desirable applications.

SUMMARY

According to one embodiment, a color-changing glass comprises from greater than or equal to about 0.1 mol. % to less than or equal to about 20 mol. % $Ho_2O_3$; and one or more chromophores selected from the group consisting of ions of V, Cr, Mn, Fe, Co, Ni, Se, Pr, Nd, Er, Yb, and combinations thereof. The amount of $Ho_2O_3$ (mol. %) is greater than or equal to 0.7 ($CeO_2$ (mol. %)+$Pr_2O_3$ (mol. %)+$Er_2O_3$ (mol. %)).

In another embodiment, a color-changing glass comprises: from greater than or equal to about 0.1 mol. % to less than or equal to about 20 mol. % $Ho_2O_3$; and one or more fluorescent ions selected from the group consisting of ions of Cu, Sn, Ce, Eu, Tb, Tm, and combinations thereof.

In yet another embodiment, a color-changing glass comprises: greater than or equal to about 0.05 mol. % of two or more fluorescent ions selected from the group consisting of ions of Cu, Sn, Ce, Eu, Tb, Tm, Sm, Dy and combinations thereof; and less than or equal to about 10 mol. % of rare earth ions.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

It is therefore desirable to provide inexpensive anti-counterfeit schemes that can be incorporated into the article and allow a purchaser to more easily determine whether a good is genuine or counterfeit may be desirable. Reference will now be made in detail to embodiments that include a color-changing glass comprising $Ho_2O_3$ in an amount from about 0.01 mol. to about 20 mol. % and/or ($Ho_2O_3$+$Nd_2O_3$) in an amount from about 0.1 mol. % to about 20 mol. %, and one or more chromophores selected from various metal ions, which, according to embodiments, can be present in the glass as metal oxides. The amount of $Ho_2O_3$ in the glass composition can be greater than or equal to 0.7 ($CeO_2$(mol. %)+$Pr_2O_3$ (mol. %)+$Er_2O_3$ (mol. %)). Embodiments also include a color-changing glass comprising $Ho_2O_3$ in an amount from about 0.01 mol. % to about 20 mol. % and/or ($Ho_2O_3$+$Nd_2O$) in an amount from about 0.1 mol, % to about 20 mol. %, and one or more fluorescent compounds selected from various metal ions. Embodiments also include a color-changing glass that comprises about 0.05 mol. % or more of two or more fluorescent ions selected from various metal ions and less than 10 mol. % of rare earth ions. Various embodiments of color changing glasses will be described in more detail herein.

Embodiments of the glasses disclosed herein are directed to color-changing glasses, such as, for example color-changing aluminosilicate glasses and color-changing alkali aluminosilicate glasses. The composition of the silicate glasses according to embodiments are outlined below; however, it should be understood that the composition of the glasses is not particularly limited to silicate glasses and that the chromophores and fluorescent compounds can be added to other types of glass-ceramics, polymers, single crystals, and glasses, including, without limitation, borate glasses, phosphate glasses, fluoride glasses, tellurate glasses, and aluminate glasses. In some embodiments, chalcogenide glasses, such as, for example, sulfide glasses can be used. In other embodiments, any materials that are not strongly absorbing in the visible light spectrum can be used.

Holmium-Containing Glasses

In an exemplary silicate glass composition, $SiO_2$ is the largest constituent and, as such, $SiO_2$ is the primary constituent of the glass network formed from the glass composition. Pure $SiO_2$ has a relatively low CTE. However, pure $SiO_2$ has a high melting point. Accordingly, if the concentration of $SiO_2$ in the glass composition is too high, the formability of the glass composition can be diminished as higher concentrations of $SiO_2$ increase the difficulty of melting the glass, which, in turn, adversely impacts the formability of the glass. Low $SiO_2$ glasses, such as, for example, glass with less than 40 mol. % $SiO_2$, tend to have poor durability and resistance to devitrification, so it is practical to have more than 40% $SiO_2$ and more than 50% $SiO_2$ for ease of forming. However, it should be understood that glasses that do not include silica can also be used in embodiments. For example phosphate glasses, borate glasses, and other non-silica glasses could be used according to embodiments.

In embodiments, the glass composition can comprise $SiO_2$ in a concentration from greater than or equal to about 40 mol. % to less than or equal to about 80 mol. %, such as from greater than or equal to about 50 mol. % to less than or equal to about 75 mol. %. In other embodiments, the glass composition can comprise $SiO_2$ in a concentration from greater than or equal to about 55 mol. % to less than or equal to about 70 mol. %, such as from greater than or equal to about 62 mol. % to less than or equal to about 69 mol. %.

As discussed above, embodiments of the glass composition are directed to aluminosilicate glasses. Thus, the glass composition of embodiments can further comprise $Al_2O_3$ in addition to $SiO_2$. $Al_2O_3$ can serve as a glass network former, similar to $SiO_2$. $Al_2O_3$ can increase the viscosity of the glass composition due to its tetrahedral coordination in a glass melt formed from a properly designed glass composition. However, when the concentration of $Al_2O_3$ is balanced against the concentration of $SiO_2$ and, optionally, the concentration of alkali oxides in the glass composition, $Al_2O_3$ can reduce the liquidus temperature of the glass melt, thereby enhancing the liquidus viscosity and improving the compatibility of the glass composition with certain forming processes. The $Al_2O_3$ also serves as an aid to increase the solubility of rare earth dopants such as the oxides of Ho, Ce, Sm, Eu, Tb, Dy, and Tm. In pure $SiO_2$, rare earth oxide contents greater than 500-1000 ppm can result in phase separation or devitrification, but aluminosilicates can have up to 25 mol % rare earth oxide and still be stable (Hwa L. G., Lee T. H., Szu S. P., 39 Mater. Res. Bull. 33 (2004); and Clayden N. J., Esposito S., Aronne A., Pernice P., 258 J. Non-Cryst. Solids 11 (1999)). In addition, $Al_2O_3$ can enhance the ion exchange performance of alkali silicates. For chemically strengthened alkali aluminosilicate glasses, the $Al_2O_3$ content can be between 5 and 25 mol %.

In embodiments, the glass composition can comprise $Al_2O_3$ in a concentration from greater than or equal to about 5.0 mol. % to less than or equal to about 25 mol. %, such as from greater than or equal to about 7.0 mol. % to less than or equal to about 17 mol. %. In other embodiments, the glass composition can comprise $Al_2O_3$ in a concentration from greater than or equal to about 8.0 mol. % to less than or equal to about 14 mol. %, such as from greater than or equal to about 9.0 mol. % to less than or equal to about 10 mol. %. However, it should be understood that the glass system is not particularly limited and, thus, in some embodiments, glasses that contain from greater than or equal to about 25% to less than or equal to about 50% $Al_2O_3$ can be used. In other embodiments, the glass system can include no $Al_2O_3$.

$Na_2O$ is a component that can lower the viscosity of a glass to improve the meltability and the formability thereof. When the content of $Na_2O$ is too large, the thermal expansion coefficient of the glass becomes too large, and the thermal shock resistance of the glass can be lowered. Alkali oxides like $Li_2O$, $Na_2O$, $K_2O$, $Rb_2O$, and $Cs_2O$ can also enable ion exchange for modifying both the stress and refractive index profiles of the glass, which can enable chemical strengthening and writing of waveguides that can provide additional security features. In the case of glasses which serve as substrates for Si based electronics, such as LCD displays, Na+ ions can poison the Si transistors and degrade performance so for these applications it can be desirable to have alkali-free compositions.

In embodiments, the glass composition can comprise $Na_2O$ in a concentration from greater than or equal to about 5 mol. % to less than or equal to about 25 mol. %, such as from greater than or equal to about 10 mol. % to less than or equal to about 20 mol. %. In other embodiments, the glass composition can comprise $Na_2O$ in a concentration from greater than or equal to about 11 mol. % to less than or equal to about 17 mol. %, such as from greater than or equal to about 12 mol. % to less than or equal to about 15 mol. %. In yet other embodiments, the glass composition can comprise $Na_2O$ in a concentration of about 14 mol. %.

The glass composition can, in some embodiments, contain other elements, such as alkaline earth metal oxides. In embodiments, the alkaline earth metal oxides can be selected from MgO, CaO, SrO, BaO, and combinations thereof. These oxides can be added to increase meltability, durability, and glass stability. While ZnO is not an alkaline earth, it is a divalent oxide and serves a similar function as the above alkaline earth metal oxides and, thus, ZnO can be added to the glass composition. The alkaline earth metal oxides can be added as stabilizers that help prevent degradation of the glass composition upon exposure to environmental conditions. However, adding too much alkaline earth metal oxide to the glass composition can decrease its formability.

In embodiments, the glass composition comprises each alkaline earth metal oxide in concentrations from greater than or equal to 0.0 mol. % to less than or equal to about 25 mol. %, such as from greater than or equal to about 2.0 mol. % to less than or equal to about 20 mol. In other embodiments, the glass composition comprises alkaline earth metal oxides in concentrations from greater than or equal to about 1.0 mol. % to less than or equal to about 17 mol. %, such as from greater than or equal to about 12 mol. % to less than or equal to about 15 mol. %.

In embodiments, the glass composition can comprise fining agents, such as, for example, $SnO_2$, sulfates, chlorides, bromides, $SbO_2$, $As_2O_3$, and $Ce_2O_3$. In embodiments, the glass composition can comprise fining agents in concentrations from greater than or equal to 0.0 mol. % to less than or equal to about 1.0 mol. %, such as from greater than or equal to about 0.002 mol. % to less than or equal to about 0.9 mol. %. In other embodiments, the glass composition can comprise fining agents in concentrations from greater than or equal to about 0.05 mol. % to less than or equal to about 0.8 mol. %, such as from greater than or equal to about 0.1 mol. % to less than or equal to about 0.7 mol. %. In yet other embodiments, the glass composition can comprise fining agents in concentrations from greater than or equal to about 0.1 mol. % to less than or equal to about 0.3 mol. %, such as about 0.15 mol. %. In embodiments that use sulfates as the fining agents, the sulfates can be included in amount from greater than or equal to about 0.001 mol. % to less than or equal to about 0.1 mol. %. It should be noted that, as discussed below, embodiments may also include $Sn^{2+}$ as fluorescent ions. Therefore, in embodiments, $SnO_2$ will not be used as a fining agent so that it does not interfere with the fluorescent properties of the glass. Additionally, in embodiments where Sn ions are used as fluorescents, the concentration of Sn ions can be balanced with other fining agents.

In addition to the above silicate glass components, glass compositions according to embodiments described herein further comprise $Ho_2O_3$. The addition of $Ho_2O_3$ adds color to the glass composition. If the glass composition has a concentration of less than about 0.1 mol. % of $Ho_2O_3$, it will be difficult to notice the color of the glass with the unaided eye in path lengths less than a few millimeters. However, the glass stability suffers when concentrations of $Ho_2O_3$ are greater than about 20 mol. %, and high-$Ho_2O_3$ concentration glasses are expensive. When the $Ho^{3+}$ concentration exceeds 1 mol. %, it can quench the fluorescence of co-doped glasses via non-radiative decay of the excited state. Concentrations above 2 mol. % $Ho_2O_3$, causes the quenching becomes more severe.

Accordingly, in embodiments, the glass composition can comprise $Ho_2O_3$ in concentrations from greater than or equal to about 0.1 mol. % to less than or equal to about 20 mol. %, such as from greater than or equal to about 0.1 mol. % to less than or equal to about 10 mol. %. In other embodiments, the glass composition can comprise $Ho_2O_3$ in concentrations from greater than or equal to about 0.2 mol. % to less than or equal to about 5.0 mol. %, such as from greater than or equal to about 0.5 mol. % to less than or equal to about 2.0 mol. %.

Pure $Ho^{3+}$ doped glasses change in appearance from yellow to pink having, metamerism index (MI) of 7.8 with a change in illumination from incandescent or daylight to RGB fluorescent light. Thus, doping a glass with holmium creates a color shift when the type of light the glass is exposed to is changed. However, the color shift created when using pure $Ho^{3+}$ is not customizable based on changes to the concentration of $Ho^{3+}$. For example, if the glass is used in anti-counterfeiting measures, the color shift of the glass could be replicated, for example, by counterfeiters.

According to embodiments, to customize the color shift in holmium-containing silicate glasses, various chromophores can be added to the glass composition. The chromophores can be selected from ions of V, Cr, Mn, Fe, Co, Ni, Cu, Se, Bi, Pr, Nd, Er, Yb, and combinations thereof. In embodiments, the ions of the above chromphores can be present as oxides. Each of these chromophores can be used to impart a unique color shift when the light exposure is changed from incandescent to fluorescent. For example when $Nd_2O_3$ is added to the holmium-containing silicate glass, the color shift of the glass is from grey to fuchsia when the incident light is changed from incandescent to fluorescent light. When $Fe_2O_3$ or $V_2O_5$ is added to the holmium-containing silicate glass, the color shift of the glass is from green to pink when the incident light is changed from incandescent to fluorescent light.

In embodiments, the glass composition can comprise chromophores in concentrations from greater than or equal to 0.001 mol. % to less than or equal to about 1.5 mol. %, such as from greater than or equal to about 0.01 mol. % to less than or equal to about 1.0 mol. %. In other embodiments, the glass composition can comprise chromophores in concentrations from greater than or equal to about 0.1 mol. % to less than or equal to about 0.8 mol. %, such as from greater than or equal to about 0.15 mol. % to less than or equal to about 0.6 mol. %. In yet other embodiments, the glass composition can comprise chromophores in concentrations from greater than or equal to about 0.2 mol. % to less than or equal to about 0.5 mol %. In embodiments, the concentration of the secondary chromophores can be less than or equal to the $Ho_2O_3$ concentration to avoid overwhelming the metamerism of $Ho_2O_3$. For instance, Examples 2 and 3 in Table 1 show that even though the $Ho_2O_3$ concentration is 1 mol %, the color is dominated by the powerful blue cobalt chromophore, when only 0.01 mol % $Co_3O_4$ is added as a batch material. Examples 2 and 3 thus appear cobalt blue in any lighting conditions. However, when the batched $Co_3O_4$ is reduced to 0.004 mol % or less as shown in examples 8 and 12-14 in Table 3, the metamerism comes through and the samples appear blue in incandescent or full spectrum white light, and purple in fluorescent RGB light. As an example, $Fe_2O_3$ is not nearly as powerful as $Co_3O_4$ as a colorant batch material, so 0.1 mole % $Fe_2O_3$ shifts the incandescent color of $Ho_2O_3$ containing glasses from yellow to blue as demonstrated by example 5 in Table 1.

In addition to transition metal ion chromophores, embodiments of the glass compositions can comprise rare earth ions as colorants, which can be present as rare earth oxides in embodiments. In embodiments, ions of Ce, Pr, Nd, and Er can be added to the glass composition as rare earth ion colorants. In embodiments, the glass composition comprises rare earth ions in concentrations from greater than or equal to about 0.01 mol. % to less than or equal to about 5.0 mol %, such as from greater than or equal to about 0.05 mol. % to less than or equal to about 2.0 mol. %. Rare earth ions are weaker colorants than the transition metal ions and, thus, in embodiments, higher concentrations or rare earth ions can be needed. When $Nd_2O_3$ is added to the holmium-containing silicate glass, the amount of $(Ho_2O_3+Nd_2O_3)$ is from about 0.1 mol. % to about 20 mol. %.

Various chromophores have stable, unchanging color and, thus, the concentration of these chromophores in the glass composition should be kept low enough that the stable color of the chromophores does not affect the metamerism of the glass composition. For example, $Co_3O_4$ is a very stable blue color, and including too much $Co_3O_4$ to the glass composition will result in a glass that is blue under any light source. Accordingly, in embodiments of the glass comprising $Co_3O_4$, the concentration of $Co_3O_4$ in the glass composition can be less than or equal to about $0.01[Ho_2O_3]$, such as less than or equal to about $0.005[Ho_2O_3]$.

Like Co, stable rare earth colors can also overwhelm the matermerism of Ho and Nd in the glass composition. For example, ions of Pr, Er, Ce, and combinations thereof, can overwhelm the metamerism of Ho and/or Nd ions. Accordingly, embodiments of the glass composition have a concentration of $Ho_2O_3$ (mol. %) that is greater than or equal to about $0.7\,([Pr_2O_3]+[Er_2O_3]+[CeO_2])$, such as greater than or equal to about $1.0\,([Pr_2O_3]+[Er_2O_3]+[CeO_2])$. In embodiments, the concentration of $Nd_2O_3$ in the glass composition can be greater than or equal to $1.0\,([Pr_2O_3]+[Er_2O_3]+[CeO_2])$, such as greater than or equal to about $1.2\,([Pr_2O_3]+[Er_2O_3]+[CeO_2])$.

Embodiments of the glass composition can include fluorescent ions. In some embodiments, the fluorescent ions are used in place of the chromophores. However, in other embodiments, the fluorescent ions are present in addition to the chromophores. In embodiments, the fluorescent ions can be selected from ions of Cu, Sn, Mn, Sb, Ag, Ce, Sm, Eu, Tb, Dy, Tm, and combinations thereof. In embodiments, the fluorescent ions can be present as oxides. Using fluorescent ions allows the glass composition to emit different colors of visible light when the glass is excited with certain wavelengths of light. For example, in embodiments, the color of the fluorescent ion can emit one color when excited with light of a first wavelength (365 nm, for example) and it can emit a second color when excited with light at a second wavelength (405 nm, for example).

In embodiments, the glass composition can comprise fluorescent ions in concentrations from greater than or equal to 0.01 mol. % to less than or equal to about 5.0 mol. %, such as from greater than or equal to about 0.05 mol. % to less than or equal to about 2.0 mol. %. In other embodiments, the glass composition can comprise fluorescent ions in concentrations from greater than or equal to about 0.1 mol. % to less than or equal to about 1.0 mol. %, such as from greater than or equal to about 0.15 mol. % to less than or equal to about 0.6 mol. %. In yet other embodiments, the glass composition can comprise fluorescent ions in concentrations from greater than or equal to about 0.2 mol. % to less than or equal to about 0.5 mol. %.

Multi-Fluorescent Glasses

In embodiments, the glass composition can comprise $SiO_2$ in a concentration from greater than or equal to about 40 mol. % to less than or equal to about 80 mol. %, such as from greater than or equal to about 50 mol. % to less than or equal to about 75 mol. %. In other embodiments, the glass composition can comprise $SiO_2$ in a concentration from greater than or equal to about 55 mol. % to less than or equal to about 70 mol. %, such as from greater than or equal to about 62 mol. % to less than or equal to about 69 mol. %.

As discussed above, embodiments of the glass composition are directed to aluminosilicate glasses. Thus, the glass composition can comprise $Al_2O_3$ in a concentration from greater than or equal to about 5.0 mol. % to less than or equal to about 25 mol. %, such as from greater than or equal to about 7.0 mol. % to less than or equal to about 17 mol. %. In other embodiments, the glass composition can comprise $Al_2O_3$ in a concentration from greater than or equal to about 8.0 mol. % to less than or equal to about 14 mol. %, such as from greater than or equal to about 9.0 mol. % to less than or equal to about 10 mol. %. However, it should be understood that the glass system is not particularly limited and, thus, in some embodiments, glasses that contain from greater than or equal to about 25% to less than or equal to about 50% $Al_2O_3$ can be used. In other embodiments, the glass system can include no $Al_2O_3$.

In embodiments, the glass composition can comprise $Na_2O$ in a concentration from greater than or equal to about 5 mol. % to less than or equal to about 25 mol. %, such as from greater than or equal to about 10 mol. % to less than or equal to about 20 mol. %. In other embodiments, the glass composition can comprise $Na_2O$ in a concentration from greater than or equal to about 11 mol. % to less than or equal to about 17 mol. %, such as from greater than or equal to about 12 mol. % to less than or equal to about 15 mol. %. In yet other embodiments, the glass composition can comprise $Na_2O$ in a concentration of about 14 mol. %.

In addition to $Na_2O$ other alkali metal oxides can be included in the glass composition. In embodiments, the glass composition can include $Li_2O$ and/or $K_2O$. In some embodiments, the concentration of the additional alkali metal oxides can be the same as the concentration of $Na_2O$ in the glass composition. In other embodiments, the concentration of the additional alkali metal oxides can be different from the concentration of $Na_2O$ in the glass composition. However, in embodiments, the total concentration of alkali metal oxides in the glass composition can be less than or equal to about 18 mol. %, such as less than or equal to about 16 mol. %. In embodiment, the total concentration of alkali metal oxides in the glass composition can be less than or equal to about 14 mol. %, such as less than or equal to about 12 mol. %.

In embodiments, the glass composition can comprise $Li_2O$ and/or $K_2O$ in a concentration from greater than or equal to about 2.0 mol. % to less than or equal to about 10 mol. %, such as from greater than or equal to about 4.0 mol. % to less than or equal to about 8.0 mol. %. In other embodiments, the glass composition can comprise $Li_2O$ and/or $K_2O$ in a concentration from greater than or equal to about 6.0 mol. % to less than or equal to about 7.0 mol. %.

The glass composition can, in some embodiments, contain other elements, such as alkaline earth metal oxides. In embodiments, the alkaline earth metal oxides can be selected from MgO, CaO, SrO, BaO, ZnO (which acts similarly to alkaline earth metal oxides), and combinations thereof. In embodiments, concentrations of alkaline earth metal oxides can be from greater than or equal to 0.0 mol. % to less than or equal to about 25 mol. %, such as from greater than or equal to about 2.0 mol. % to less than or equal to about 20 mol. %. In other embodiments, the glass composition comprises alkaline earth metal oxides in concentrations from greater than or equal to about 10 mol. % to less than or equal to about 17 mol. %, such as from greater than or equal to about 12 mol. % to less than or equal to about 15 mol. %.

In embodiments, the glass composition comprises each alkaline earth metal oxide in concentrations from greater than or equal to 0.0 mol. % to less than or equal to about 9.0 mol. %, such as from greater than or equal to about 2.0 mol. % to less than or equal to about 8.0 mol. %. In other embodiments, the glass composition comprises alkaline earth metal oxides in concentrations from greater than or equal to about 3.0 mol. % to less than or equal to about 7.0 mol. %, such as from greater than or equal to about 4.0 mol. % to less than or equal to about 6.0 mol. %. In yet other embodiments, the glass composition comprises alkaline earth metal oxides in concentrations of about 5.0 mol. %.

Embodiments of the glass composition can include two or more different fluorescent ions. In embodiments, the fluorescent ions can be selected from Cu, Sn, Mn, Sb, Ce, Sm, Eu, Tb, Tm, Sm, Dy, and combinations thereof. In embodiments, the fluorescent ions can be present as oxides. Using fluorescent ions allows the glass composition to emit different colors of visible light when the glass is excited with certain wavelengths of light. In embodiments, the glass composition can fluoresce a first color at a first wavelength that is from greater than or equal to about 300 nm to less than or equal to about 400 nm, such as from greater than or equal to about 310 nm to less than or equal to about 390 nm. The glass composition can fluoresce a second color at a second wavelength that is from greater than or equal to about 400 nm to less than or equal to about 475 nm, such as from greater than or equal to about 410 nm to less than or equal to about 465 nm. The glass composition can fluoresce a third color at a third wavelength that is from greater than or equal to about 475 nm to less than or equal to about 500 nm, such as from greater than or equal to about 480 nm to less than or equal to about 495 nm.

For example, in embodiments, the color of the fluorescent ion can emit one color when excited with light of a first wavelength (365 nm, for example), it can emit a second color when excited with light at a second wavelength (405 nm, for example), and it can emit a third color when excited with light at a third wavelength (488 nm, for example). For example, embodiments can include glasses comprising oxides of Eu and oxides of Tb as its fluorescent ions. $Eu^{3+}$ doped glasses generally emit red when excited with the proper wavelength of light, and $Tb^{3+}$ doped glasses generally emit green when excited with the proper wavelength of light. However, when Eu oxides and Tb oxides are combined in a glass composition, the glass composition can emit light that is red, green, orange, yellow, or a combination of those colors at light having a wavelength of 365 nm, with the exact color depending on the proportional mixture of $Eu^{3+}$ and $Tb^{3+}$ ions in the glass. However, when the glass is excited with light at 405 nm wavelength, only the $Eu^{3+}$ is excited and red light is emitted, and when the glass is excited with 488 nm light, only the $Tb^{3+}$ is excited and green light is emitted. Accordingly, embodiments of the glass can be configured to emit three distinct colors depending on the wavelength of the light used to excite the glass composition. If the glass is melted in slightly reducing conditions, some or all of the $Eu^{3+}$ can be reduced to $Eu^{2+}$ which emits blue light when excited at wavelengths below 400 nm. Such a glass co-doped with $Tb^{3+}$ will emit white ($Eu^{2+}$, $Eu^{3+}$, and $Tb^{3+}$ emission) light when excited at wavelengths of about 365 nm, purple ($Eu^{2+}$ and $Eu^{3+}$ emission) when excited at wavelengths of about 394 nm, blue ($Eu^{2+}$ emission, only) when excited at wavelengths of about 310 or about 330 nm, aqua ($Eu^{2+}$ and $Tb^{3+}$ emission) when excited at wavelengths of about 342 nm, green ($Tb^{3+}$ emission only) when excited at wavelengths of about 484 nm, and red ($Eu^{3+}$ emission only) when excited at wavelengths of about 464 nm.

Some fluorescent ions can cross relax or quench each other, so the selection and concentration of each ion has to be engineered to ensure both ions are emitting. For example, when the concentration of $Eu_2O_3$ exceeds about 2 mol %, in a $Tb^{3+}$ emitting glass, most of the excited $Tb^{3+}$ ions can transfer their energy to neighboring $Eu^{3+}$ ions and only the red emission of the $Eu^{3+}$ ion can be left even if the excitation wavelength only excites the $Tb^{3+}$ ion. This energy transfer mechanism can also be used to sensitize a fluorescent ion to increase the effective absorption of pump energy.

In embodiments, the glass composition can comprise fluorescent ions in concentrations from greater than or equal to 0.01 mol. % to less than or equal to about 5 mol. %, such as from greater than or equal to about 0.05 mol. % to less than or equal to about 2.0 mol. %. In other embodiments, the glass composition can comprise fluorescent ions in concentrations from greater than or equal to about 0.1 mol. % to less than or equal to about 1 mol. %, such as from greater than or equal to about 0.15 mol. % to less than or equal to about 0.6 mol. %. In yet other embodiments, the glass composition can comprise fluorescent ions in concentrations from greater than or equal to about 0.2 mol. % to less than or equal to about 0.5 mol. %.

In addition to fluorescent ions, embodiments of the glass compositions can comprise rare earth ions as colorants. In embodiments, the rare earth ions can be present as rare earth oxides. In embodiments, ions of Nd, Er, Pr, and Ce can be added to the glass composition as rare earth ion colorants. In embodiments, the ions of Nd, Er, Pr, and Ce can be present in the glass as oxides. In embodiments, the concentration of rare earth ion in the glass composition can be less than the concentration of fluorescent ions in the glass composition. In some embodiments, the concentration of $Ce_2O_3$ in the glass composition is less than the concentration of fluorescent ions in the glass composition.

The multifluorescent glasses can also be doped with transition metal ions to impart color in addition to the multifluorescent effect. If the glass is strongly absorbing near the fluorescence wavelength, then the fluorescence will be absorbed or quenched. To avoid fluorescence quenching, the concentration of these dopants should be kept below 0.5 mole % and for strong chromophores like $Co^{2+}$ and $Ni^{2+}$ ions, below 0.1 mole %. In cases where the absorption of the chromophores overlaps the fluorescence (such as the case where the red emission of $Eu^{3+}$ would be annihilated by the red absorption of the $Co^{2+}$), the chromophore concentration should be below 0.02 mole %.

In embodiments, the glass composition comprises rare earth ions in concentrations from greater than or equal to about 0.1 mol. % to less than or equal to about 10 mol %, such as from greater than or equal to about 0.2 mol. % to less than or equal to about 7.0 mol. %. In other embodiments, the glass composition comprises rare earth ions in concentrations from greater than or equal to about 0.3 mol. % to less than or equal to about 5.0 mol %, such as from greater than or equal to about 0.4 mol. % to less than or equal to about 3.0 mol. %. In yet other embodiments, the glass composition comprises rare earth ions in concentrations from greater than or equal to about 0.5 mol. % to less than or equal to about 2.0 mol %, such as from greater than or equal to about 0.8 mol. % to less than or equal to about 1.0 mol. %.

Color-changing glasses according to embodiments may be used in many different applications. For example, glasses that change color can be used as aesthetic embellishments on, for example, clothing, electronics, and packaging. Further, color-changing glasses can be used as anti-counterfeiting systems. For example, glasses according to embodiments can be formed to have a first customized color in broad spectrum white light and a second customized color in RGB fluorescent light, or a glass can be formed to fluoresce three customized colors by using three different fluorescent ions. In this way it can be easy to detect whether a good is counterfeit by simply exposing the glass to light of certain wavelengths.

It should now be understood that glass compositions described herein are color-changing silicate glasses that include one or more of holmium or neodymium, chromophores, and fluorescent ions. The various combinations of one or more of holmium, chromophores, and fluorescent ions allow the color of the glass to be customizable and changeable depending on the lighting exposure. The customizable and changeable color allows the glass to be used as decorative glass and as an anti-counterfeiting scheme. For example, a glass can include $Eu^{2+}$ and $Tb^{3+}$ ions so that the glass emits blue ($Eu^{2+}$ emission, only) when excited at wavelengths of about 310 or about 330 nm, aqua ($Eu^{2+}$ and $Tb^{3+}$ emission) when excited at wavelengths of about 342 nm, green ($Tb^{3+}$ emission only) when excited at wavelengths of about 484 nm. This glass can then be exposed to these different wavelengths of light and if it does not fluoresce properly, it can be determined that the good is counterfeit. Using this anti-counterfeiting system, counterfeit goods can easily and quickly be detected. In contrast, many known anti-counterfeiting schemes have been developed that use secretive, expensive "black box" sensors to indicate whether a good is genuine or counterfeit. However, many of these anti-counterfeiting schemes require specialized equipment, which is generally not available to consumers, to determine whether a good is genuine or counterfeit. There is also a problem with counterfeit "black boxes" that falsely indicate a product is genuine. Further, the anti-counterfeit schemes often cannot be incorporated into the article in an aesthetically pleasing manner.

In addition to being added as aesthetic embellishments, glasses according to embodiments may be used as bottles and containers for goods. For example, perfumes, colognes, liqueurs, medicines, and electronics are frequently counterfeited and, thus, the containers for these goods can be made from color-changing glasses according to embodiments disclosed herein. To meet these various uses, glasses according to embodiments may be formed into articles such as bottles and glass sheets by any suitable glass forming method. For example, color-changing glass bottles may be made in numerous shapes and sizes by glass forming methods including, for example, blow molding, punch molding, punch and blow molding, and other suitable molding processes. Color-changing glasses according to some embodiments may be formed into glass sheets that may be applied, for example, to electronics by methods such as, for example, floating or fusion drawing as disclosed in U.S. Pat. Nos. 3,338,696 and 3,682,609, which are herein incorporated by reference in its entireties.

In some embodiments, glasses disclosed herein can be subjected physical or chemical strengthening. For example, the glasses can be tempered by heat treatments or strengthened by ion exchange. In an ion-exchange process, the glass may be exposed to an alkali ion containing solution, such as, for example, $KNO_3$ or $NaNO_3$. Upon exposure to the alkali ion containing solution, smaller alkali ions in the glass, such as, for example, Li and Na ions, are exchanged with larger ions, such as, for example, Na and K. This ion exchange reinforces the glass matrix and can strengthen the glass. Suitable ion exchange methods are disclosed in U.S. Pat. No. 5,674,790, which is herein incorporated by reference in its entirety. In addition to strengthening the glasses, the strengthening process can make the glass compositions frangible so that if the glass is tampered with it will shatter. In anti-counterfeiting systems, the frangibility of the glass is a beneficial anti-tampering element.

EXAMPLES

Embodiments will be further clarified by the following examples.

Example 1

Holmium-Containing Glasses

Glass composition having the compostions disclosed in Tables 1 and 3 below are prepared by mixing 1 kg batches of sane, aluminum oxide, sodium carbonate, sodium nitrate, magnesium oxide, tin oxide, holmium oxide, neodymium oxide, vanadium pentoxide, iron oxide, and cobalt oxides, loading them in a platinum crucible, and melting for 6 hours at 1650° C. The melts are then poured onto a steel table, and annealed at 670° C. for 2 hours before cooling to room temperature. The resulting glass patties are cut and polished for color coordinate measurements.

The examples in Table 1 are directed to glasses comprising holmium and at least one chromophore according to embodiments disclosed herein. The comparative examples in Table 1 either do not comprise holmium or do not comprise a chromophore. Examples 2 and 3 in Table 1 show that even though the $Ho_2O_3$ concentration is 1 mole %, the color is dominated by the powerful blue chromophore cobalt oxide, when only 0.01 mole $Co_3O_4$ is added as a batch material. Examples 2 and 3 thus appear cobalt blue in any lighting conditions. However, when the batched $Co_3O_4$ is reduced to 0.004 mole % or less as shown in examples 5 and 12-14 in Table 3, the metamerism comes through and the samples appear blue in incandescent or full spectrum white light, and purple in fluorescent RGB light. $Fe_2O_3$ is not nearly as powerful as $Co_3O_4$ as a colorant batch material, so 0.1 mole % $Fe_2O_3$ shifts the incandescent color of $Ho_2O_3$ containing glasses from yellow to blue as demonstrated by example 5 in Table 1. Example 6 shows that 0.05 $V_2O_3$ is enough to shift the color of 1 mole $Ho_2O_3$ to green in full spectrum white light.

TABLE 1

| Glass | Composition (mol. %) | | | | | | | | | | Absorptive Color Illumination | |
|---|---|---|---|---|---|---|---|---|---|---|---|---|
| | $SiO_2$ | $Al_2O_3$ | $Na_2O$ | MgO | $SnO_2$ | $Ho_2O_3$ | $Nd_2O_3$ | $V_2O_5$ | $Fe_2O_3$ | $Co_3O_4$ | Incandescent | Fluorescent |
| Comp. 1 | 68 | 10.7 | 14.7 | 5.4 | 0.2 | 1 | 0 | 0 | 0 | 0 | Yellow | Pink |
| Comp. 2 | 68 | 10.7 | 14.7 | 5.4 | 0.2 | 0 | 1 | 0 | 0 | 0 | Purple | Blue |
| Ex. 1 | 68 | 10.7 | 14.7 | 5.4 | 0.2 | 1 | 1 | 0 | 0 | 0 | Grey | Fuchsia |
| Comp. 3 | 68 | 10.7 | 14.7 | 5.4 | 0.2 | 2 | 0 | 0 | 0 | 0 | Yellow | Pink |
| Ex. 2 | 68 | 10.7 | 14.7 | 5.4 | 0.2 | 1 | 0 | 0 | 0 | 0.01 | Blue | Blue |
| Ex. 3 | 68 | 10.7 | 14.7 | 5.4 | 0.2 | 1 | 0 | 0 | 0 | 0.05 | Dark Blue | Dark Blue |
| Ex. 4 | 68 | 10.7 | 14.7 | 5.4 | 0.2 | 1 | 0 | 0 | 0.05 | 0 | Green | Pink |
| Ex. 5 | 68 | 10.7 | 14.7 | 5.4 | 0.2 | 1 | 0 | 0 | 0.1 | 0 | Green | Dull Pink |
| Ex. 6 | 68 | 10.7 | 14.7 | 5.4 | 0.2 | 1 | 0 | 0.05 | 0 | 0 | Green | Pink |

Table 2 shows the matermerism index for the glass compositions of Table 1.

TABLE 2

| Compos | Absorptive Color Coordinates | | | | | | | | | | | |
|---|---|---|---|---|---|---|---|---|---|---|---|---|
| | D65-10 | | | FO2-10(CWF) | | | A-10 | | | | | |
| Glass | L* | a* | b* | L* | a* | b* | L* | a* | b* | MI (D65-FO2) | MI (F)2-A10) | MI (D65-A10) |
| Comp. 1 | 84.55 | −4.69 | 28.7 | 85.63 | 1.26 | 23.77 | 85.66 | 1.38 | 28.06 | 7.80 | 4.29 | 6.20 |
| Comp. 2 | 74.21 | 3.3 | −18.41 | 70.95 | −5.1 | −24.07 | 73.16 | 5.53 | −19.6 | 10.64 | 11.74 | 2.74 |
| Ex. 1 | 68.18 | −2.56 | 6.11 | 65.92 | −3.39 | −5.02 | 68.25 | 6.25 | 4.98 | 11.39 | 14.08 | 8.88 |
| Comp. 3 | 81.21 | −2.05 | 34.44 | 83.04 | 5.65 | 28.54 | 82.82 | 3.05 | 34.65 | 9.87 | 6.64 | 5.35 |
| Ex. 2 | | | | | | | | | | | | |
| Ex. 3 | | | | | | | | | | | | |
| Ex. 4 | 83.78 | −5.57 | 28.86 | 84.95 | 0.92 | 24.1 | 84.79 | 0.18 | 27.99 | 8.13 | 3.96 | 5.90 |
| Ex. 5 | 82.29 | −6.66 | 28.97 | 83.44 | 0.16 | 24.39 | 83.18 | −0.92 | 27.79 | 8.30 | 3.58 | 5.93 |
| Ex. 6 | 81.34 | −4.96 | 29.08 | 82.5 | 1.02 | 24.62 | 82.43 | 0.96 | 28.32 | 7.55 | 3.70 | 6.07 |

Table 2 shows the corresponding color coordinates in L*, a*, b* space as a function of standard illumination conditions. D65 is natural daylight, F-02 is fluorescent light, and A-10 corresponds to incandescent light. There are substantial shifts in the color coordinates between the full spectrum white light and RGB fluorescent illuminants, with the Nd—Ho combination showing the greatest metamerism.

The examples in Table 3 are directed to glasses comprising holmium and at least one fluorescent ion according to embodiments disclosed herein. Comparative Example 4 shows metamerism when the illumination is changed and fluorescence looks red. Ex 7 exhibits metamerism and shows $Eu^{3+}$ red emission when excited, but the emission is tinted orange since the $Eu^{3+}$ emission is filtered by the $Ho^{3+}$ absorption. Example 10 shows the characteristic $Tb^{3+}$ emission when excited at 254 or 365 nm (which is normally green) but gets shifted to yellow because of the $Ho^{3+}$ absorption. When excited at 405 nm only the weak $Ho^{3+}$ emission is observed. Comparative Example 13 shows how $Nd^{3+}$ causes the $Sn^{2+}$ fluorescence to appear purple as the white $Sn^{2+}$ emission gets filtered through the purple $Nd^{3+}$ doped glass.

TABLE 3

Fluorescent and metameric glasses

| | Glass Composition (Mol. %) | | | | | | | | | | |
|---|---|---|---|---|---|---|---|---|---|---|---|
| | $SiO_2$ | $Al_2O_3$ | $Na_2O$ | MgO | $SnO_2$ | $Ho_2O_3$ | $Nd_2O_3$ | $Eu_2O_3$ | $Tb_2O_3$ | $CeO_2$ | $La_2O_3$ |
| Comp. 4 | 68 | 10.7 | 14.7 | 5.4 | 0.2 | 2 | | 0 | 0 | 0 | 0 |
| Comp. 5 | 68 | 10.7 | 14.7 | 5.4 | 0.2 | 0 | | 2 | 0 | 0 | 0 |
| Ex. 7 | 68 | 10.7 | 14.7 | 5.4 | 0.2 | 1 | | 1 | 0 | 0 | 0 |
| Comp. 6 | 68 | 10.7 | 14.7 | 5.4 | 0.2 | 2 | | 0 | 0 | 0 | 0 |
| Ex. 8 | 68 | 10.7 | 14.7 | 5.4 | 0.2 | 2 | | 0 | 0 | 0 | 0 |
| Ex. 9 | 68 | 10.7 | 14.7 | 5.4 | 0.2 | 2 | | 0 | 0 | 0 | 0 |
| Ex. 10 | 68 | 10.7 | 14.7 | 5.4 | 0.2 | 1 | | 0 | 1 | 0 | 0 |
| Comp. 7 | 68 | 10.7 | 14.7 | 5.4 | 0.2 | 0 | | 0 | 2 | 0 | 0 |
| Comp. 8 | 68 | 10.7 | 14.7 | 5.4 | 0.2 | 0 | | 0 | 0 | 0.2 | 1.8 |
| Comp. 9 | 68 | 10.7 | 14.7 | 5.4 | 0.2 | 0 | 0 | 2 | 0 | 0 | |
| Ex. 11 | 68 | 10.7 | 14.7 | 5.4 | 0.2 | 0.7 | 0 | 1.3 | 0 | 0 | |
| Ex. 12 | 68 | 10.7 | 14.7 | 5.4 | 0.2 | 2 | 0 | 0 | 0 | 0 | |
| Es. 13 | 68 | 10.7 | 14.7 | 5.4 | 0.2 | 2 | 0 | 0 | 0 | 0 | |
| Ex. 14 | 68 | 10.7 | 14.7 | 5.4 | 0.2 | 2 | 0 | 0 | 0 | 0 | |
| Comp. 10 | 68 | 10.7 | 14.7 | 5.4 | 0.2 | 0 | 0 | 0.7 | 1.3 | 0 | |
| Comp. 11 | 68 | 10.7 | 14.7 | 5.4 | 0.2 | 0 | 0 | 0 | 1.8 | 0.2 | |
| Comp. 12 | 68 | 10.7 | 14.7 | 5.4 | 0.2 | 0 | 0 | 1.9 | 0 | 0.1 | |
| Comp. 13 | 68 | 10.7 | 14.7 | 5.4 | 0.2 | 0 | 2 | 0 | 0 | 0 | |

| | Glass Composition (Mol. %) | | Fluorescent Color Excitation Wavelength | | | Absorptive Color Illumination | |
|---|---|---|---|---|---|---|---|
| | $Fe_2O_3$ | $Co_3O_4$ | 254 nm | 365 nm | 405 nm | Incandescent | Fluorescent |
| Comp. 4 | 0 | 0 | Yellow | None | Orange | Yellow | Pink |
| Comp. 5 | 0 | 0 | Red | Red | Red-Orange | Yellow | Yellow |
| Ex. 7 | 0 | 0 | Orange | Orange | Orange | Yellow | Pink |
| Comp. 6 | 0 | 0 | Yellow | Faint Yellow | Orange | Yellow | Pink |
| Ex. 8 | 0 | 0.004 | White | None | Orange | Blue | Purple |
| Ex. 9 | 0.12 | 0 | Faint Green | None | Violet | Green | Salmon |
| Ex. 10 | 0 | 0 | Yellow | Yellow-Green | Orange | Yellow | Pink |
| Comp. 7 | 0 | 0 | Green | Green | Orange | Clear | Clear |
| Comp. 8 | 0 | 0 | Blue | Blue | Blue | Clear | Clear |
| Comp. 9 | | 0 | Red | Red | Red | Clear | Clear |
| Ex. 11 | | 0 | Red | Red | Red | Yellow | Pink |
| Ex. 12 | | 0.002 | White | None | None | Blue | Purple |
| Es. 13 | | 0.003 | White | None | None | Blue | Purple |
| Ex. 14 | | 0.004 | White | None | None | Blue | Purple |
| Comp. 10 | | 0 | Lt Orange | Yellow-Orange | Red-Orange | Clear | Clear |
| Comp. 11 | | 0 | Green | Lt Green | Lt green | Clear | Clear |
| Comp. 12 | | 0 | Red | Red | Red | Clear | Clear |
| Comp. 13 | | 0 | Purple | None | None | Clear | Clear | then also exhibits a yellow fluorescence when excited with 254 nm light from a mercury lamp. This is a result of the bluish white fluorescence of the $Sn^{2+}$ in the glass filtered through the absorption of the $Ho^{3+}$ resulting in the yellow fluorescence. When excited at 365 nm no fluorescence is observed and then when excited at 405 nm the weak $Ho^{3+}$ orange emission is visible. In Comparative Example 5, the $Eu^{3+}$ emission overwhelms the white $Sn^{3+}$ emission and the Multifluorescent Glasses Glass compositions having the compositions disclosed in Tables 4 below are prepared by mixing 1 kg batches of sand, aluminum oxide, lithium carbonate, sodium carbonate, potassium nitrate, strontium carbonate, barium carbonate, zinc oxide, europium oxide, thulium oxide, terbium oxide, samarium oxides, loading them in a platinum crucible, and melting for 3 hours at 1500° C. The melts are then poured onto a steel table, and then annealed at 510° C. for 2 hours before cooling to room temperature. The examples in Table 4 are directed to glasses comprising multiple fluorescent ions according to embodiments disclosed herein. The comparative examples in Table 4 do not comprise multiple fluorescent ions. As can be seen in Table 4, comps 14-17 and 18-20 only emit a single color. However, the multiple doped glasses in Ex15-20 emit one color when excited at 365 nm where $Eu^{3+}$, $Tm^{3+}$, and $Tb^{3+}$ are all excited, but only emit red when excited at 405 nm where only the $Eu^{3+}$ ion is excited.

TABLE 4

Multifluorescent Glasses

| | Composition (Mol. %) | | | | | | | | | | | | Fluorescent Color Excitation Wavelength | |
|---|---|---|---|---|---|---|---|---|---|---|---|---|---|---|
| | $SiO_2$ | $Al_2O_3$ | $Li_2O$ | $Na_2O$ | $K_2O$ | SrO | BaO | ZnO | $Eu_2O_3$ | $Tm_2O_3$ | $Tb_2O_3$ | $Sm_2O_3$ | 365 nm | 405 nm |
| Comp. 14 | 69 | 0.7 | 4 | 4 | 4 | 7 | 5 | 6 | 0.1 | 0 | | | Red | Red |
| Comp. 15 | 69 | 0.7 | 4 | 4 | 4 | 7 | 5 | 6 | 0 | 0.1 | | | Blue | None |
| Comp. 16 | 69 | 0.7 | 4 | 4 | 4 | 7 | 5 | 6 | 0 | 0.2 | | | Blue | None |
| Comp. 17 | 69 | 0.7 | 4 | 4 | 4 | 7 | 5 | 6 | 0 | 0.25 | | | Blue | None |
| Ex. 15 | 69 | 0.7 | 4 | 4 | 4 | 7 | 5 | 6 | 0.01 | 0.25 | | | Purple | Red |
| Ex. 16 | 69 | 0.7 | 4 | 4 | 4 | 7 | 5 | 6 | 0.05 | 0.25 | | | Fuchsia | Red |
| Ex. 17 | 69 | 0.7 | 4 | 4 | 4 | 7 | 5 | 6 | 0.1 | 0.25 | | | Pink | Red |
| Ex. 18 | 69 | 0.7 | 4 | 4 | 4 | 7 | 5 | 6 | 0.9 | | 0.6 | 0 | Orange | Red |
| Ex. 19 | 69 | 0.7 | 4 | 4 | 4 | 7 | 5 | 6 | 1 | | 0.5 | 0 | Red-Orange | Red |
| Ex. 20 | 69 | 0.7 | 4 | 4 | 4 | 7 | 5 | 6 | 0.45 | | 1.05 | 0 | Yellow | Red |
| Comp. 18 | 69 | 0.7 | 4 | 4 | 4 | 7 | 5 | 6 | 0 | | 0 | 0.2 | Orange | Orange |
| Comp. 19 | 69 | 0.7 | 4 | 4 | 4 | 7 | 5 | 6 | 0 | | 0 | 0.3 | Orange | Orange |
| Comp. 20 | 69 | 0.7 | 4 | 4 | 4 | 7 | 5 | 6 | 0 | | 0 | 0.4 | Orange | Orange |

As discussed above, in embodiments, colorants, chromophores, and fluorescent ions can be present in the glass as oxides of their respective components. Accordingly, it should be understood that when referring to oxides of colorants, chromophores, and fluorescents hereinabove, the colorants, chromophores, and fluorescents can be present as compounds other than oxides.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass comprising
   greater than or equal to 55 mol. % to less than or equal to 70 mol. % $SiO_2$; $Ho_2O_3$;
   greater than or equal to 0.5 mol. % to less than or equal to 20 mol. % ($Ho_2O_3+Nd_2O_3$) and
   one or more fluorescent ions selected from the group consisting of oxides of Cu, Sn, Mn, Ag, Sb, Ce, Sm, Eu, Tb, Dy, Tm, and combinations thereof.

2. The glass of claim 1, wherein the glass further comprises:
   greater than or equal to 5.0 mol. % to less than or equal to 15 mol. % $Al_2O_3$;
   greater than or equal to 10 mol. % to less than or equal to 25 mol. % $Na_2O$;
   0 mol. % to less than or equal to 25 mol. % MgO; and
   0 mol. % to 1.0 mol. % $Sn\,O_2$.

3. The glass of claim 1, wherein the glass further comprises:
   greater than or equal to 8.0 mol. % to less than or equal to 14 mol. % $Al_2O_3$;
   greater than or equal to 12 mol. % to less than or equal to 15 mol. % $Na_2O$;
   greater than or equal to 2.0 mol. % to less than or equal to 20 mol. % MgO; and
   greater than or equal to 0.1 mol. % to less than or equal to 0.3 mol. % $SnO_2$.

4. The glass of claim 1, wherein the glass further comprises from 0.5 mol. % to 2 mol. % ($Ho_2O_3+Nd_2O_3$).

5. The glass of claim 1, wherein the glass comprises $Nd_2O_3$ in an amount such that $Nd_2O_3$ (mol. %) is greater than or equal to ($CeO_2$ (mol. %)+$Pr_2O_3$ (mol. %)+$Er_2O_3$ (mol. %)).

6. The glass of claim 1, wherein a total concentration of fluorescent ions is from greater than or equal to 0.01 mol. % to less than or equal to 5.0 mol. %.

7. The glass of claim 1, wherein the glass comprises $CeO_2$ and the amount of $CeO_2$ (mol. %) is less than an amount of other fluorescent ions present in the glass.

8. The glass of claim 1, wherein the glass has a first color when exposed to light of a first wavelength, and a second color when exposed to light of a second wavelength.

9. The glass of claim 1, wherein the glass has a first color when exposed to light of a first wavelength, a second color when exposed to light of a second wavelength, and a third color when exposed to light of a third wavelength.

10. The glass of claim 1, wherein the glass is physically or chemically strengthened.

* * * * *

UNITED STATES PATENT AND TRADEMARK OFFICE
CERTIFICATE OF CORRECTION

PATENT NO. : 11,306,246 B2
APPLICATION NO. : 16/735237
DATED : April 19, 2022
INVENTOR(S) : Matthew John Dejneka et al.

It is certified that error appears in the above-identified patent and that said Letters Patent is hereby corrected as shown below:

On the Title Page

Item (56), in Column 2, under "Other Publications", Line 4, delete "Minerologist" and insert -- Mineralogist --.

On the page 2, in Column 2, under "Other Publications", Line 5, delete "At Fxandrite" and insert -- Alexandrite --.

On the page 2, in Column 2, under "Other Publications", Line 6, delete "Aluninos-iicale" and insert -- Aluminosilicate --.

On the page 2, in Column 2, under "Other Publications", Line 8, delete "Clayden et a!.," and insert -- Clayden et al., --.

On the page 2, in Column 2, under "Other Publications", Line 9, delete "alumninosilicaie" and insert -- aluminosilicate --.

On the page 2, in Column 2, under "Other Publications", Line 13, delete "Minerologist" and insert -- Mineralogist --.

On the page 2, in Column 2, under "Other Publications", Line 40, delete "Appliaction" and insert -- Application --.

In the Claims

In Column 16, Line 4, in Claim 2, delete "Sn $O_2$." and insert -- $SnO_2$. --.

Signed and Sealed this
Twenty-eighth Day of June, 2022

*Katherine Kelly Vidal*
*Director of the United States Patent and Trademark Office*